March 24, 1970   B. H. SANDERS   3,502,429
REGENERATION OF AN ENCLOSED ATMOSPHERE
Filed April 2, 1965
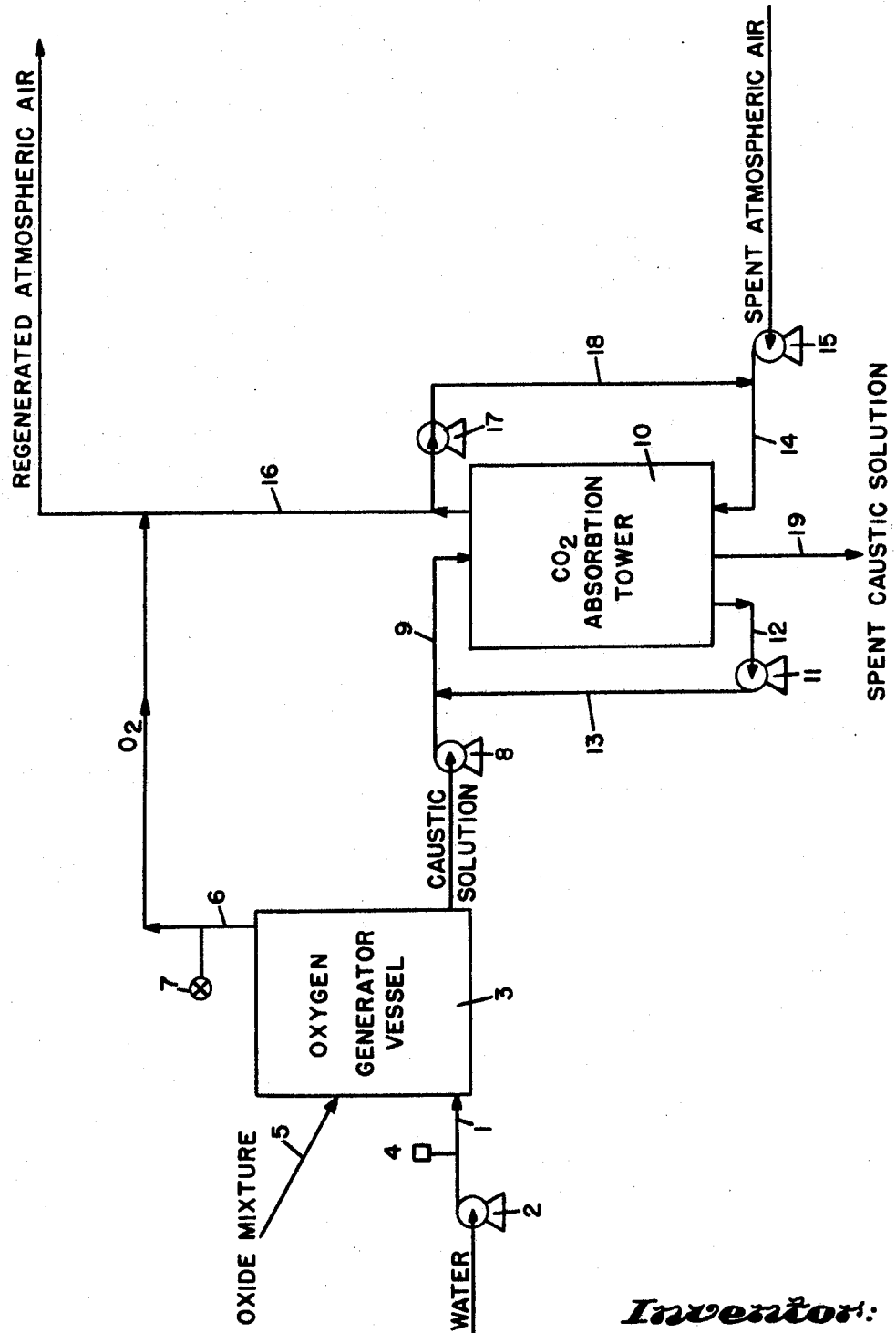
Inventor:
Burton H. Sanders,
by Norman E. Saliba
Attorney

United States Patent Office 3,502,429
Patented Mar. 24, 1970

3,502,429
REGENERATION OF AN ENCLOSED
ATMOSPHERE
Burton H. Sanders, Brookline, Mass., assignor to
Ionics, Incorporated, Cambridge, Mass.
Filed Apr. 2, 1965, Ser. No. 445,197
Int. Cl. A61l 9/10; B01d 53/00
U.S. Cl. 23—4                                          4 Claims

ABSTRACT OF THE DISCLOSURE

The invention is directed to a process for regenerating exhaled air. The process comprises dissolving compacted pellets or bars of metal higher oxides in water to allow the generation of oxygen gas and the formation of a caustic solution. The $CO_2$ content of the exhaled air is removed by absorption on the caustic solution, the resulting air then being added to the generated oxygen gas for rebreathing of the same.

---

This invention relates to a process for atmospheric regeneration and more particularly to the use of alkali metal hyperoxide compounds for the removal of carbon dioxide from the ambient atmosphere and the generation of oxygen in manned closed systems such as submarines and space vehicles. Specifically, the process relates to a liquid system employing a mixture of oxide, peroxide, sesquioxides (also called trioxides) and superoxide compounds to obtain the desired human respiratory quotient as required in such closed systems.

As used herein, the term "atmospheric regeneration" means the purification of air as by removal of excess carbon dioxide and the revitalization of air as by the addition of oxygen. "Respiratory Quotient" (RQ) of a human being is defined as the ratio of carbon dioxide exhaled to oxygen inhaled (expressed as mol per mol). This ratio is not equal to one since, due to human metabolic action, part of the oxyen inhaled is converted to water, the remaining oxygen being exhaled as carbon dioxide. For example, aboard a submarine the ratio of $CO_2:O$ is more nearly equal to about 0.85; that is, only about 0.85 cubic foot of $CO_2$ is produced in return for every cubic foot of oxygen consumed by the crew.

"Alkali metal higher oxides" and "alkali metal hyperoxides" as used herein, are understood to mean a mixture, blend or solid solution of compounds having the empirical formulas $M_2O$, $M_2O_2$, $M_2O_3$ and $MO_2$ (sometimes written $M_2O_4$) where M refers to an alkali metal (that is lithium, sodium, potassium, rubidium and cesium) capable of forming a cation $M^+$. These compounds are referred to respectively as oxides, peroxides, sesquioxides (sometimes called trioxides) and superoxides. The oxides contain $O^=$ ions, the perioxides $O_2^=$ ions, the superoxides $O_2^-$ ions, and the sesquioxides both $O_2^=$ and $O_2^-$ ions. It is contemplated that oxides of the alkaline earth group of the Periodic Table may also be used.

It is well known that metal higher oxide compounds will react directly with gaseous carbon dioxide in the presence of water vapor to release oxygen. If the reaction goes to completion, then, in the case of sodium peroxide ($Na_2O_2$), one mole of $CO_2$ reacts therewith to release ½ mole of oxygen as follows:

(1)     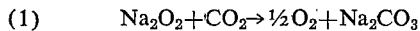

In the case of potassium superoxide ($KO_2$), one mole of $CO_2$ will react to produce 1½ moles of oxygen as follows:

(2)     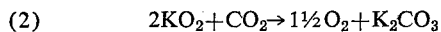

This unique property of such oxides has led many investigators to employ these compounds in the form of dry granules directly for atmospheric regeneration, especially aboard submarines, in an attempt to maintain the required respiratory quotient (about 0.85). The compounds are employed in a dry particulate or granular form and exposed to the submarine's atmospheric as by spreading the granules on trays or by confining the material in canisters of personal breathing apparatus. In the use of the self-contained breathing apparatus using $KO_2$, it is necessary to add a catalyst such as copper oxychloride to the solid oxide granules to assist in the $CO_2$-sorption process. However, in the use of a solid system employing the dry particulate oxide material, the oxygen release is seldom substantially quantitative due to, for example, the occurrence of side reactions with the moisture in the air. This gives rise to the formation of hydrated metal oxides and carbonates which apparently blind the surfaces of the particles and inhibit further reaction with $CO_2$. Such blinding is difficult to reproduce under pratcical conditions and under these circumstances, the ratio of $CO_2$ absorbed to the $O_2$ released cannot be predicted. Therefore, control of the atmospheric composition to the desired respiratory quotient is extremely difficult, if not impossible.

Furthermore, the granular materials have a low bulk density and require considerable storage space which is especially undesirable where space is at a premium, as aboard submarines or other manned sealed cabins. The granules, which are dry and friable, also present the danger of dusting during transfer steps to cause choking and severe irritation on contact with the skin. Additionally, their large surface areas increase the chances of undesired contact and reactions.

In general, the invention, as disclosed herein, comprises a liquid system employing a two-step process for controlled atmospheric regeneration. The first step involves the substantially complete and reproducible reaction of the higher oxides with excess water preferably in the presence of a decomposition catalyst resulting in the release of oxygen gas and the simultaneous formation of an aqueous caustic solution. The second step involves the absorption of excess carbon dioxide of the atmosphere into the aqueous caustic solution. This novel combination of steps is a simple and reliable process which allows the desired respiratory quotient to be readily controllable. The yield of oxygen in a water system is substantially quantitative; and the $CO_2$-absorption end point, i.e., the degree of conversion of the caustic to the bicarbonate or carbonate, is easily regulated. We have found that such higher oxides, which are a mixture, blend or solid solution of the oxides, peroxides, sesquioxides and superoxides of the alkali metals should have the empirical formula $M_2O_x$ where x is in the range of 2.5 to 3.5. These should be combined with a small amount preferably not more than 2 percent or less than 0.1 percent of a decomposition catalyst such as platinum, manganese dioxide, ferric chloride or copper oxychloride.

Accordingly, it is an object of the present invention to regenerate the atmosphere in manned closed systems by employing metal higher oxides in a liquid system for reliability of operation.

A further object is to employ a mixture of alkali metal oxides, such as the oxide, peroxide, superoxide and sesquioxide to obtain the desired respiratory quotient as required aboard manned sealed cabins.

Another object is to employ the higher oxide in a compacted form to diminish the dangers inherent in the use of the particulate forms.

Another object is to employ a novel and improved process for atmospheric regeneration which allows the ratio of carbon dioxide absorbed to oxygen evolved to be readily controllable.

Various other objects and advantages will appear from the following description of the invention, and the novel features will be particularly pointed out hereafter in connection with the appended claims.

The principles and features of the invention are readily understood when taken in connection with the accompanying drawing by considering the basic steps for practicing the same. It is understood that details may be modified or varied without departure from the principles of the invention. Additionally, the invention may be practiced by structures other than the ones shown. The accompanying drawing is a schematic diagram of the apparatus illustrating generally the flow of materials and the treatment thereof.

The process for carrying out the invention will be described, by way of example, by reference to the apparatus shown schematically in the accompanying drawing and in particular to the use of an initial mixture of sodium peroxide ($Na_2O_2$) and potassium superoxide ($KO_2$). In this installation, water is passed through a conduit 1 under sufficient positive pressure as by a pump 2 into an enclosed oxygen-generator vessel 3. Means for controlling the rate of liquid flow into the vessel may be employed as by a flow controller 4 located in the conduit 1. It is preferable that the water be obtained from a substantially pure source but, where pure water is not plentiful, as during submarine travel, it would be feasible to obtain the required water from the ocean. Where raw sea water is directly employed, however, the addition of the higher oxides can cause a gelatinous precipitate to form in the resultant caustic solution. This would require means for removing the precipitate as by filtration or centrifugation. When the required volume of water has been added into the vessel, the oxide mixture to be employed is added directly into the generator vessel 3 using feeding means 5. This direct feeding of the oxide is best accomplished by an enclosed solid-conveyor-type feeding apparatus (not shown). The oxide may be employed in particulate form as received by the manufacturer but the use of compacted oxide forms are preferred not only to save storage space but to simplify handling and avoid dusting.

In the use of granules or particulate forms of the oxide, there is a handling problem since the drums containing the granular oxide would have to be periodically opened and the contents transferred to a feeder or directly into the generator vessel. The granules must be kept away from contact with moisture and combustible materials such as wood, cloth, oils, etc. To reduce the disadvantages inherent in the use of the granular material, the oxide should be employed in compacted forms such as bricks or bars having maximum densities. Each bar can be fed at a controlled rate through a seal into the water-containing generator vessel; or, where bricks are employed, they may be introduced directly into the vessel at preset intervals automatically or manually. The bricks can be automatically released, one at a time, by means of an enclosed conveyor chute. In case of over-production of oxygen, the bar is withdrawn; or, in the case of the bricks, the feeding is terminated.

The use of compacted oxides facilitates ease of handling and decreases the number of material-transfer steps since they may be shipped in containers, individually packaged in wrapper material. The wrapper should be impermeable to moisture and gases and easily removed by automatic means. The compacted oxides should have a weight and volume which would permit easy handling; as, for example, of a brick size weighing about 30 lbs. This would, of course, reduce storage space requirements since the bulk density of the bricks would be at least 75 lbs. per cubic foot instead of the 10–40 lbs. for the noncompacted material. The greatly-reduced surface area of the compacted material will correspondingly reduce the possibility of undesired contact and reaction.

The composition of the oxide mixture employed is so selected that in the reaction with water, a quantitative release of oxygen will occur. As previously stated, it is preferable to include a decomposition catalyst in the mixture. The alkali hydroxide formed, which preferably is between about 0.5 to 6 normal in concentration, is then quantitatively reacted with carbon dioxide so that the ratio of carbon dioxide absorbed to oxygen evolved (RQ) and the end ratio of carbonate to bicarbonate is optimum from the standpoint of high carbon dioxide absorption rate. For example, if the desired RQ is 0.85, as would be required aboard a submarine, then stoichiometrically an oxide mixture of 19.3 mol percent of $Na_2O_2$ and 80.7 mol percent of $KO_2$ are required. This oxide mixture comprising approximately 21 percent by weight of sodium peroxide ($Na_2O_2$) and approximately 79 percent by weight of potassium superoxide ($KO_2$) would be reacted with the water in the generator vessel. This has the empirical formula $M_2O_{3.35}$. Stoichiometrically, this will allow substantially all caustic solution produced to react to substantially all carbonate without bicarbonate formation while achieving an RQ of 0.85. Of course, it is to be understood that different RQ values will require a different peroxide-superoxide mixture to achieve the same end point or, in the alternate, the carbon dioxide absorption end point can be changed. The use of other oxide mixtures in place of the $Na_2O_2$-$KO_2$ mixture may also be employed and, in such cases, the stoichiometry would be adjusted accordingly. The oxides for making a compacted mixture of $Na_2O_2$-$KO_2$ is, however, readily available commercially. Sodium peroxide is sold as free-flowing particles under the trade name "Solozone" and will liberate 20 percent of its weight as active oxygen. Potassium superoxide is sold commercially in granular form with an available oxygen content of 32 percent of its weight. Lithium superoxide ($LiO_2$) and sodium superoxide ($NaO_2$) have the greatest potential for use in the process of this invention since they have a high ratio of oxygen to total formula weight. For example, $LiO_2$ theoretically contains 61.5 percent by weight of active oxygen. However, these superoxides are not readily available and are relatively expensive. The mixed oxides of $Na_2O_2$-$KO_2$ may be made from a dry blend of commercial $Na_2O_2$ and $KO_2$. This blending should be performed under controlled conditions to combat hydroscopicity and the tendency of the oxides to react with the moisture in the air. For any desired $CO_2/O_2$ ratio, the required composition of the oxide mix on a mole basis may be readily calculated. In the use of $Na_2O_2$ alone, 0.5 mole of oxygen will be released for each mole of carbon dioxide removed giving a ratio of $CO_2/O_2$ of 2.0 if $CO_2$-sorption is carried out to an all-carbonate end point. In the case of $KO_2$ alone, 1.5 moles of oxygen are generated for every mole of carbon dioxide removed for a ratio of 0.67. When the ratio of $CO_2/O_2$ is required to be 0.85, then the use of $Na_2O_2$ alone leads to an underproduction of oxygen and $KO_2$ alone gives an overproduction of oxygen relative to the carbon dioxide. Consequently, reaction of one cubic foot of dry $CO_2$ with a $Na_2O_2$-$KO_2$ mixture will yield values between 0.5 to 1.5 cubic feet of oxygen depending on the composition of the mix. Thus, in order to obtain a carbon dioxide to oxygen ratio of 0.85, it is necessary that a specific composition of $Na_2O_2$-$KO_2$ be dissolved in the water. The desired composition may be readily calculated from the following equation where RQ equals the $CO_2/O_2$ ratio desired:

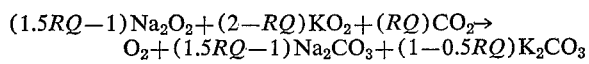

$$(1.5RQ-1)Na_2O_2 + (2-RQ)KO_2 + (RQ)CO_2 \rightarrow$$
$$O_2 + (1.5RQ-1)Na_2CO_3 + (1-0.5RQ)K_2CO_3$$

If, for example, an RQ of 0.85 is desired, then, by substituting the proper value for RQ, the equation gives the following:

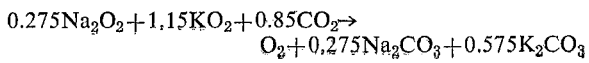

$$0.275Na_2O_2 + 1.15KO_2 + 0.85CO_2 \rightarrow$$
$$O_2 + 0.275Na_2CO_3 + 0.575K_2CO_3$$

Thus, for a respiratory quotient of 0.85, there would be required a $Na_2O_2$-$KO_2$ mixture comprising 19.3 mol percent $Na_2O_2$ and 80.7 mol percent $KO_2$ to be reacted with excess water in the oxygen generator vessels; this is equivalent on a weight basis to 21 percent $Na_2O_2$ and 79 percent $KO_2$.

The oxygen evolved from the reaction is allowed to escape from the generator vessel 3 via an oxygen gas outlet conduit 6. Means for controlling the oxygen pressure buildup in the vessel can be obtained by incorporating a pressure relief valve 7 into the gas outlet conduit 6. The generation of oxygen is preferably, but not necessarily, operated on a semi-continuous basis to produce, for example, a batch of 2 normal caustic solution on dissolution of the higher oxide. This would require about 28.3 gallons of water for a 30 lb. brick of the mixed oxide. Rapid release of all the oxygen contained in a 30 lb. brick would not cause a radical increase in the atmospheric oxygen content (less than 0.12 percent) of a submarine containing 85,000 cubic feet of free space.

From the generator vessel the caustic solution of the desired strength is withdrawn by pumping means 8 and passed through inlet conduit 9 into an absorption or scrubber tower 10 such as a conventional counter current or cocurrent packed tower or other types such as a spray tower. The tower is preferably designed so that the caustic solution preferably makes a single pass through the absorber. Alternatively, the caustic solution can be continuously recirculated therethrough by pumping means 11 being removed from the tower at outlet conduit 12 and returned to inlet conduit 9 by means of return conduit 13.

Simultaneously with the flow of the caustic, atmospheric air containing excess carbon dioxide such as 1 percent carbon dioxide is directed into the tower through inlet conduit 14 by means of pump 15. The air, after passing through the tower, is removed at outlet conduit 16. Preferably, the tower is designed so that about half of the carbon dioxide in the air is removed in a single pass through the tower. The air is then sent back to the cabin. Alternatively, at least part of the air may, if desired, be recirculated by pump 17 back to the tower by way of return conduit 18. The amount of air recirculated is controlled to yield the desired carbon dioxide removal. The air issuing from the scrubber is combined with the evolved oxygen from oxygen conduit 6 and returned to the manned system. The spent caustic solution is carried away from the absorption tower through waste discharge outlet conduit 19.

The removal of carbon dioxide by suitable contact of a carbon dioxide containing gas phase with the aqueous caustic solution is rapid and efficient. The carbon dioxide stripping rate will, of course, vary with the size of the scrubber, the temperature and concentration of the caustic solution employed, the absolute pressure, flow rate, carbon dioxide content of the gas phase, etc. The carbon dioxide should be removed from an enclosed atmosphere at a composite average rate about equal to the carbon dioxide production rate of the men within the enclosure to avoid an eventual buildup to toxic levels. Atmospheric analyzers (not illustrated in the drawing) may be employed to continuously record and monitor the oxygen and carbon dioxide level in the atmosphere. The caustic solution will also effectively remove hydrogen sulfide, sulfur dioxide, mercaptans, hydrofluorine, hydrochlorine, nitric acids and other similar poisonous gases that may be present in the enclosed atmosphere.

The following examples show by further illustration and may not by way of limitation the invention disclosed herein.

EXAMPLE 1

A column having an inside diameter of about three inches and a height of about eighteen inches is packed to an internal height of about twelve inches with ¼ inch Berl saddles. At the bottom of the column, provisions are made for introducing air and for removing liquid. At the top of the column, provisions are made for removing air and for introducing liquid. In a dry box, 2575 grams of finely divided commercial potassium superoxide, 472 grams of finely divided commercial sodium peroxide and 30 grams of copper oxychloride powder are thoroughly mixed and compressed in a pellet press to pellets about ½ inch in diameter and ½ inch high. The above mixture is sufficient to prepare about 1200 to about 1250 pellets, each weighing about 2.5 grams. These pellets are dissolved, with stirring, over the course of an hour in twenty liters of water, the temperature being maintained at 190 degrees Fahrenheit. The gas which evolves is cooled to 72 degrees Fahrenheit and the volume measured in a calibrated wet test meter. It is found to be about 685 liters (dry basis) at 72 degrees Fahrenheit. This amount of gas is sufficient for the daily metabolic requirements of one man performing moderately active physical work eight hours per day. The metabolism of this amount of gas will result in the production of about 1060 grams of carbon dioxide (about 580 liters, dry basis at 72 degrees Fahrenheit).

The water then containing primarily potassium and sodium hydroxides is cooled to about 72 degrees Fahrenheit and adjusted with water to a total volume of 24 liters. It is pumped into the top of the packed column with a calibrated precision metering pump at a rate of 1000 milliliters per hour. Eighty liters per minute of air and 0.80 liter per minute of carbon dioxide are metered and mixed together and then fed into the bottom of the column. This mixture contains 1 percent $CO_2$ by volume which is typical of closed manned environments such as submarines, aerospace vehicles and hardened command and control centers. The liquid passing through the column is collected in a closed container so that it is not in contact with air. When all of the liquid has passed through the column, requiring about 24 hours, an aliquot is analyzed for combined carbon dioxide, and it is found that the liquid has picked up about 1070 grams of carbon dioxide equivalent to 586 liters of carbon dioxide (dry basis) at 72 degrees Fahrenheit, therefore almost identical to that amount which would result from the oxygen generated by the hyperoxides. Since the total amount of carbon dioxide passing through the column is about 1150 liters, approximately half of the carbon dioxide has been removed from the air stream.

EXAMPLE 2

The experiment of Example 1 is repeated except that 2832 grams of finely divided commercial potassium superoxide and 30 grams of copper oxychloride powder are used. The mixture is sufficient to prepare about 1200 pellets, each weighing about 2.4 grams. The volume of oxygen evolved is found to be about 685 liters (dry basis) at 72 degrees Fahrenheit, sufficient for the daily metabolic requirements of one man. An aliquot of the liquid passing through the column is analyzed for combined carbon dioxide, and it is found that the liquid has picked up about 880 grams of carbon dioxide equivalent to 482 liters of carbon dioxide (dry basis) at 72 degrees Fahrenheit, therefore only 83 percent of that which would result from the oxygen generated by the hyperoxide. This is an unstable situation and, in the absence of auxiliary carbon dioxide removal procedures, death of the human occupant must result.

EXAMPLE 3

The experiment of Example 1 is repeated except 2317 grams of finely divided commercial potassium superoxide, 949 grams of finely divided commercial sodium peroxide and 30 grams of copper oxychloride are used. The mixture is sufficient to prepare about 1250 to 1300 pellets, each weighing about 2.6 grams. The volume of oxygen evolved is found to be about 685 liters (dry basis) at 72 degrees Fahrenheit, sufficient for the daily metabolic requirements of one man. An aliquot of the liquid passing through the column is analyzed for combined carbon dioxide; and, it is found that the liquid has picked up about 1250 grams of carbon dioxide, equivalent to 684 liters of carbon dioxide (dry basis) at 72 degrees Fahrenheit, therefore about 18 percent more than that which would, on the average, result from the oxygen generated by the hyperoxide. This is a highly stable situation in which satisfied fluctuations in the amount of $CO_2$ generated can be readily accommodated.

EXAMPLE 4

The experiment of Example 1 is repeated except that finely divided sodium superoxide and potassium peroxide are used. The sodium peroxide is prepared in accordance with the directions of Stephanou, Schechter, Argersinger and Kleinberg. The Journal of the American Chemical Society, vol. 71, pp. 1819–1821, and analyzes 92 percent $NaO_2$. The results are shown in the following table:

| Experiment | $NaO_2$ (grams) | $K_2O_2$ (grams) | $CO_2$ removed (grams) |
|---|---|---|---|
| (a) | 2,170 | 420 | 1,070 |
| (b) | 1,950 | 1,115 | 1,250 |
| (c) | 2,300 | 0 | 960 |

In each experiment 30 grams of copper oxychloride are used as a catalyst and about 685 liters of oxygen (dry basis, at 72 degrees Fahrenheit) are evolved. In Experiment (a), the $CO_2$ removed in the absorber substantially matches that which would be produced from the oxygen evolved; in Experiment (b), about 18 percent more $CO_2$ is absorbed than would be generated from the $O_2$ evolved, thereby giving a very stable system; but in Experiment (c), about 9 percent less $CO_2$ is absorbed than would be generated from the $O_2$ evolved, thereby giving an unstable situation in which death of the occupant must result (in the absence of other means for removing $CO_2$).

EXAMPLE 5

The experiment of Example 1 is repeated, except that 2832 grams of finely divided potassium superoxide, 125 grams of finely divided lithium oxide and 30 grams of copper oxychloride are used. It is found that about 685 liters of oxygen (dry basis, at 72 degrees Fahrenheit) are evolved and about 1070 grams of carbon dioxide are absorbed. Thus, the $CO_2$ absorbed substantially matches that which would be produced from the oxygen evolved.

What is claimed is:
1. A process for regenerating an enclosed atmosphere by continuously supplying to said atmosphere about one cubic foot of oxygen for about every 0.85 cubic foot of carbon dioxide removed therefrom, the steps comprising:
   (a) compacting under superatmospheric pressure oxides selected from the group consisting of alkali and alkaline earth metal higher oxides and mixtures thereof;
   (b) reacting said compacted metal higher oxides with sufficient water to substantially release a quantitative amount of oxygen therefrom with the simultaneous production of the corresponding metal hydroxide solution;
   (c) passing said formed metal hydroxide solution into an absorption tower and simultaneously therewith passing the spent atmosphere into intimate contact therewith in said absorption tower;
   (d) and combining the released oxygen gas from step (b) with the scrubbed effluent gas from step (c) for further use as regenerated atmospheric air.

2. The process of claim 1 wherein the metal higher oxide is a mixture comprised of not less than 10 mol percent of a metal peroxide, the remainder being substantially metal superoxide.

3. The process of claim 1 wherein the metal higher oxide mixture is in compacted form with a bulk density of at least about 40 lbs. per cubic foot and wherein the aqueous caustic formed has a concentration of between about 0.5 to 6 normal.

4. The process of claim 1 wherein the metal higher oxide is a mixture of about 21 percent by weight of sodium peroxide and about 79 percent by weight of potassium superoxide.

References Cited

UNITED STATES PATENTS

| 795,679 | 7/1905 | Bamberger et al. | 23—4 |
| 2,160,542 | 5/1939 | Gerson | 23—4 X |
| 2,761,755 | 9/1956 | Brown | 23—2 |
| 2,913,317 | 5/1959 | Bovard | 23—221 X |

OSCAR R. VERTIZ, Primary Examiner

E. C. THOMAS, Assistant Examiner

U.S. Cl. X.R.

23—2, 221; 252—186